(12) United States Patent
Morikawa et al.

(10) Patent No.: US 12,360,613 B2
(45) Date of Patent: Jul. 15, 2025

(54) INFORMATION PROCESSING DEVICE, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Takashi Morikawa, Kanagawa (JP); Hirotake Sasaki, Kanagawa (JP); Kiyoshi Iida, Kanagawa (JP); Toshihiko Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 337 days.

(21) Appl. No.: 17/897,971

(22) Filed: Aug. 29, 2022

(65) Prior Publication Data
US 2023/0236674 A1 Jul. 27, 2023

(30) Foreign Application Priority Data

Jan. 26, 2022 (JP) ................................. 2022-010001

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/011* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS 7,978,178 B2 * 7/2011 Pehlivan ............... G08C 17/00
345/169
8,793,620 B2 7/2014 Stafford
(Continued)

FOREIGN PATENT DOCUMENTS

JP H09-265353 A 10/1997
JP 5807989 B2 11/2015

OTHER PUBLICATIONS

Author: Nguyen et al.; Title: 3DTouch: A wearable 3D input device for 3D applications; pp. 8; Date: Mar. 2015; Source: https://www.researchgate.net/publication/317300060_3DTouch_Towards_a_Wearable_3D_Input_Device_for_3D_Applications (Year: 2015).*

*Primary Examiner* — Jwalant Amin
(74) *Attorney, Agent, or Firm* — Oliff PLC

(57) ABSTRACT

An information processing device includes a processor configured to: based on an attitude of equipment being worn or held by a user, set a sight direction of the user in a virtual three-dimensional space; based on a virtual viewpoint and the sight direction set in the virtual three-dimensional space, generate a two-dimensional image by projecting the virtual three-dimensional space; cause the two-dimensional image to be displayed on a display; based on an attitude of a pointer being held by the user, set an emission angle of a ray emitted virtually to the virtual three-dimensional space; and in a case where sensitivity reduction conditions that an amount of angular change of the sight direction of the user within a predetermined time is less than or equal to a threshold viewing angle and that an amount of angular change of an emission angle of the ray within a predetermined time is less than or equal to a threshold emission angle are satisfied, reduce the amount of angular change of the emission angle of the ray relative to the amount of angular change of the (Continued)

attitude of the pointer, compared to a case where the sensitivity reduction conditions are not satisfied.

10 Claims, 5 Drawing Sheets

(51) Int. Cl.
  *G06F 3/038* (2013.01)
  *G06T 11/00* (2006.01)
  *G06T 15/20* (2011.01)
  *G06T 19/00* (2011.01)

(52) U.S. Cl.
  CPC .............. *G06F 3/038* (2013.01); *G06T 11/00* (2013.01); *G06T 15/20* (2013.01); *G06T 19/00* (2013.01)

(56) References Cited

U.S. PATENT DOCUMENTS

| | | | |
|---|---|---|---|
| 9,483,143 B2 * | 11/2016 | Malkin | G06F 3/0482 |
| 9,971,401 B2 | 5/2018 | Stafford | |
| 2002/0024500 A1 * | 2/2002 | Howard | G06F 3/014 |
| | | | 345/158 |
| 2013/0141011 A1 * | 6/2013 | Fushimi | H05B 47/1965 |
| | | | 315/294 |
| 2015/0293586 A1 * | 10/2015 | Kritt | G06F 3/013 |
| | | | 345/158 |
| 2016/0210473 A1 * | 7/2016 | Cohen | G06F 21/60 |
| 2017/0160796 A1 * | 6/2017 | Oto | A63F 13/35 |
| 2018/0168444 A1 * | 6/2018 | Foss | A61B 3/113 |
| 2021/0167982 A1 * | 6/2021 | Iida | H04L 12/282 |
| 2022/0219533 A1 * | 7/2022 | Narushima | B60K 35/81 |
| 2023/0244311 A1 * | 8/2023 | Kaku | H04N 13/351 |
| | | | 348/78 |

* cited by examiner

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-010001 filed Jan. 26, 2022.

BACKGROUND

(i) Technical Field

The present disclosure relates to an information processing device, an information processing method, and a non-transitory computer readable medium.

(ii) Related Art

A method for identifying a gaze point of a user on a display and reducing the moving speed of a cursor as the distance between the current position of the cursor moved on the display in accordance with a mouse operation and the gaze point decreases, is disclosed in Japanese Patent No. 5807989. A control method for monitoring the vicinity of a cursor moving on a display in accordance with a mouse operation and reducing the moving speed of the cursor to facilitate an operation as an object approaches the cursor, is disclosed in Japanese Unexamined Patent Application Publication No. 9-265353.

SUMMARY

A device that sets a virtual viewpoint and a sight direction in a virtual three-dimensional space and causes a two-dimensional image obtained by projecting the virtual three-dimensional space to be displayed on a display on the basis of the virtual viewpoint and the sight direction has been known. A case where a user, using such a device, causes a pointer that the user is holding to virtually emit a ray (virtual beam) to a virtual three-dimensional space and points a specific position in the virtual three-dimensional space will be considered.

If the pointer has a high sensitivity, it may be difficult for the user to point a desired position using the pointer (that is, a ray). The sensitivity of a pointer represents the amount of angular change of the emission angle of a ray emitted from the pointer relative to the amount of angular change of the attitude (may be called the orientation) of the pointer.

The sensitivity of the pointer may be able to be changed by a user operation. However, the user needs to perform a separate operation for changing the sensitivity of the pointer. Such an operation may cause trouble to the user and may decrease the level of concentration of the user.

Aspects of non-limiting embodiments of the present disclosure relate to, in a device that causes a two-dimensional image obtained by projecting a virtual three-dimensional space to be displayed on a display on the basis of a virtual viewpoint and a sight direction set in the virtual three-dimensional space, when a user is pointing or is trying to point a specific position in the virtual three-dimensional space using a pointer that virtually emits a ray to the virtual three-dimensional space, reducing the sensitivity of the pointer without requiring the user to perform a separate operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: based on an attitude of equipment being worn or held by a user, set a sight direction of the user in a virtual three-dimensional space; based on a virtual viewpoint and the sight direction set in the virtual three-dimensional space, generate a two-dimensional image by projecting the virtual three-dimensional space; cause the two-dimensional image to be displayed on a display; based on an attitude of a pointer being held by the user, set an emission angle of a ray emitted virtually to the virtual three-dimensional space; and in a case where sensitivity reduction conditions that an amount of angular change of the sight direction of the user within a predetermined time is less than or equal to a threshold viewing angle and that an amount of angular change of an emission angle of the ray within a predetermined time is less than or equal to a threshold emission angle are satisfied, reduce the amount of angular change of the emission angle of the ray relative to the amount of angular change of the attitude of the pointer, compared to a case where the sensitivity reduction conditions are not satisfied.

BRIEF DESCRIPTION OF THE DRAWINGS

An exemplary embodiment of the present disclosure will be described in detail based on the following figures, wherein.

DETAILED DESCRIPTION

Figure 1:
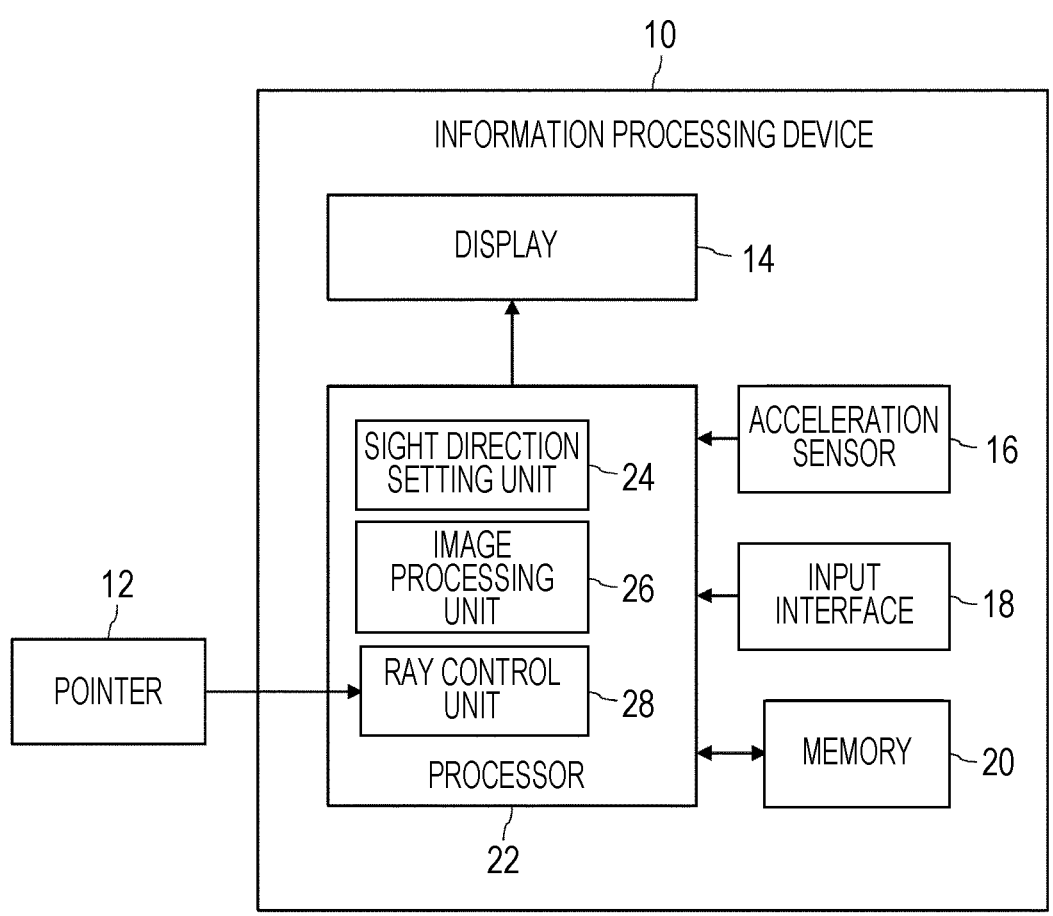
FIG. 1 is a schematic diagram of a configuration of an information processing device according to an exemplary embodiment.

FIG. 1 is a schematic diagram of a configuration of an information processing device 10 according to an exemplary embodiment. The information processing device 10 is a device that causes a two-dimensional image generated by projecting a virtual three-dimensional space to be displayed on a display 14. More specifically, the information processing device 10 is a device that causes a two-dimensional image generated by projecting a virtual object arranged in a virtual three-dimensional space to be displayed on the display 14.

The information processing device 10 according to this exemplary embodiment is a virtual reality (VR) device implementing so-called VR that displays a virtual three-dimensional space background and a two-dimensional image representing a virtual object arranged in the virtual three-dimensional space. As described later, however, the information processing device 10 may be an augmented reality (AR) device implementing so-called AR that displays a real three-dimensional space background and a two-dimensional image representing a virtual object. Furthermore, the information processing device 10 may be a mixed reality (MR) device or a substitutional reality (SR) device implementing MR or SR, which is a mixture of VR and AR. VR, AR, MR, SR, and the like are called extended reality (XR). That is, the information processing device 10 may be an XR device.

The information processing device 10 is a device that is used by being worn or held by a user. For example, the information processing device 10 is a head mounted display (HMD), smartglasses, or a tablet terminal. Obviously, the information processing device 10 is not limited to the device described above.

In this exemplary embodiment, a virtual object arranged in a virtual three-dimensional space is not particularly limited. For example, a network graph may be arranged as a virtual object in a virtual three-dimensional space. A network graph includes a plurality of nodes each associated with predetermined information and edges each representing the relationship between two nodes (strictly speaking, the relationship between information associated with two nodes).

A user who uses the information processing device 10 also uses a pointer 12. The pointer 12 is used by being held by the user. The pointer 12 is used by the user to point a desired position in a virtual three-dimensional space. Specifically, a ray (virtual laser) is emitted to a virtual three-dimensional space from the pointer 12. As with a real laser, a ray stops when hitting a virtual object in a virtual three-dimensional space, and the virtual object is irradiated with the ray. A user is able to point a desired virtual object by causing the desired virtual object to be irradiated with a ray. Specific description of a ray will be provided later.

The display 14 is, for example, a liquid crystal panel, an organic electroluminescence (EL), or a waveguide (light-guide panel). A two-dimensional image formed by a processor 22, which will be described later, is displayed on the display 14.

An acceleration sensor 16 is a sensor that detects the position and attitude of the information processing device 10. Specifically, the acceleration sensor 16 performs calibration processing when the information processing device 10 is located at a predetermined position and has a predetermined attitude, and detects a displacement from a calibration position of the information processing device 10 in directions of three axes that are orthogonal to one another and a rotation angle from a calibration attitude, where the three axes are taken as central axes, the displacement and rotation angle being defined in the real three-dimensional space.

An input interface 18 includes a button, a touch panel, and the like. The input interface 18 is used by the user to input an instruction to the information processing device 10.

A memory 20 includes, for example, an embedded multi media card (eMMC), a read only memory (ROM), or a random access memory (RAN). An information processing program for operating units of the information processing device 10 is stored in the memory 20. The information processing program may be stored in, for example, a computer-readable non-transitory storage medium such as a universal serial bus (USB) memory or a compact disc-read only memory (CD-ROM). The information processing device 10 is capable of reading the information processing program from the storage medium mentioned above and executing the information processing program.

Furthermore, attribute information about one or more virtual objects arranged in a virtual three-dimensional space is stored in the memory 20. The attribute information about a virtual object includes information indicating the form of the virtual object, information indicating the name of the virtual object, information indicating the position in a virtual three-dimensional space where the virtual object is arranged, information indicating the contents of the virtual object, and the like.

As illustrated in FIG. 1, the processor 22 implements functions as a sight direction setting unit 24, an image processing unit 26, and a ray control unit 28 in accordance with the information processing program stored in the memory 20.

Figure 2:
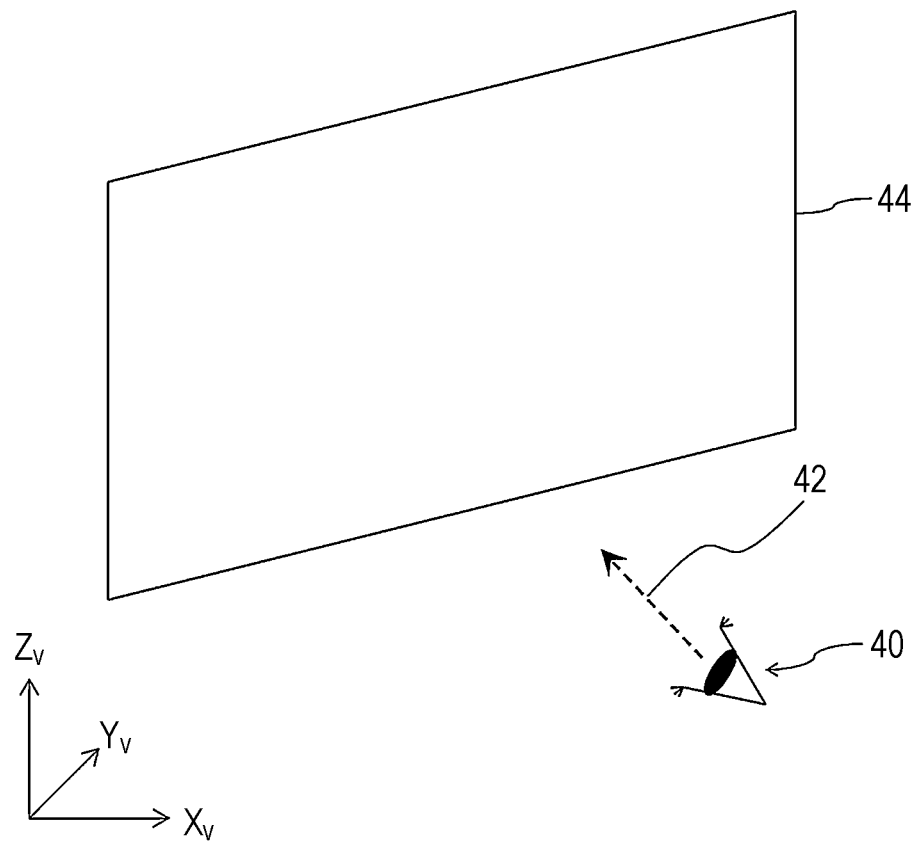
FIG. 2 is a diagram illustrating a virtual viewpoint, a sight direction, and a virtual screen.

The sight direction setting unit 24 sets a virtual viewpoint and a sight direction of a user in a virtual three-dimensional space. FIG. 2 illustrates a virtual viewpoint 40 and a sight direction 42 set in a virtual three-dimensional space represented by an $X_V$ axis, a $Y_V$ axis, and a $Z_V$ axis. Specifically, the sight direction setting unit 24 sets the position of the virtual viewpoint 40 on the basis of the position of the information processing device 10 in the real three-dimensional space, and sets the sight direction 42 on the basis of the attitude of the information processing device 10 in the real three-dimensional space.

Specifically, when the acceleration sensor 16 performs calibration, the virtual viewpoint 40 is set at a predetermined position in the virtual three-dimensional space. Then, on the basis of a displacement from a calibration position of the information processing device 10 detected by the acceleration sensor 16 (displacement in the real three-dimensional space), the position of the virtual viewpoint 40 in the virtual three-dimensional space is changed. Furthermore, when the acceleration sensor 16 performs calibration, a predetermined direction in the virtual three-dimensional space is set as the sight direction 42. Then, on the basis of the rotation angle from a calibration attitude of the information processing device 10 detected by the acceleration sensor 16 (rotation angle in the real three-dimensional space), the sight direction 42 in the virtual three-dimensional space is changed. The sight direction 42 represents the central direction of a view from the virtual viewpoint 40, where the view has a specific viewing angle (for example, 180 degrees). That is, the view from the virtual viewpoint 40 has a viewing angle centered in the sight direction 42.

Furthermore, the sight direction setting unit 24 may set an upward vector indicating an upward direction of the view from the virtual viewpoint 40. The upward vector may also be set based on the attitude of the information processing device 10 in the real three-dimensional space. The upward vector may be fixed to an upward side in the vertical direction in the virtual three-dimensional space ($Z_V$ axis positive side).

Hereinafter, the sight direction 42 will be represented by a vector (θxu, θyu, θzu). θxu represents a rotation angle around the $X_V$ axis in the virtual three-dimensional space, θyu represents a rotation angle around the $Y_V$ axis in the virtual three-dimensional space, and θzu represents a rotation angle around the $Z_V$ axis in the virtual three-dimensional space. The vector (θxu, θyu, θzu) also represents the attitude of the information processing device 10 in the real three-dimensional space.

The image processing unit 26 projects a virtual three-dimensional space on the basis of the virtual viewpoint 40 and the sight direction 42 set by the sight direction setting unit 24 and generates a two-dimensional image.

First, as illustrated in FIG. 2, the image processing unit 26 defines a virtual screen 44 in a virtual three-dimensional space. The virtual screen 44 may be a plane that is perpendicular to the sight direction 42 and has a size covering the view from the virtual viewpoint 40. In this exemplary embodiment, the image processing unit 26 generates a two-dimensional image by producing a perspective projection of a virtual three-dimensional space (for more details, a virtual object arranged in the virtual three-dimensional space) onto the virtual screen 44.

Figure 3:
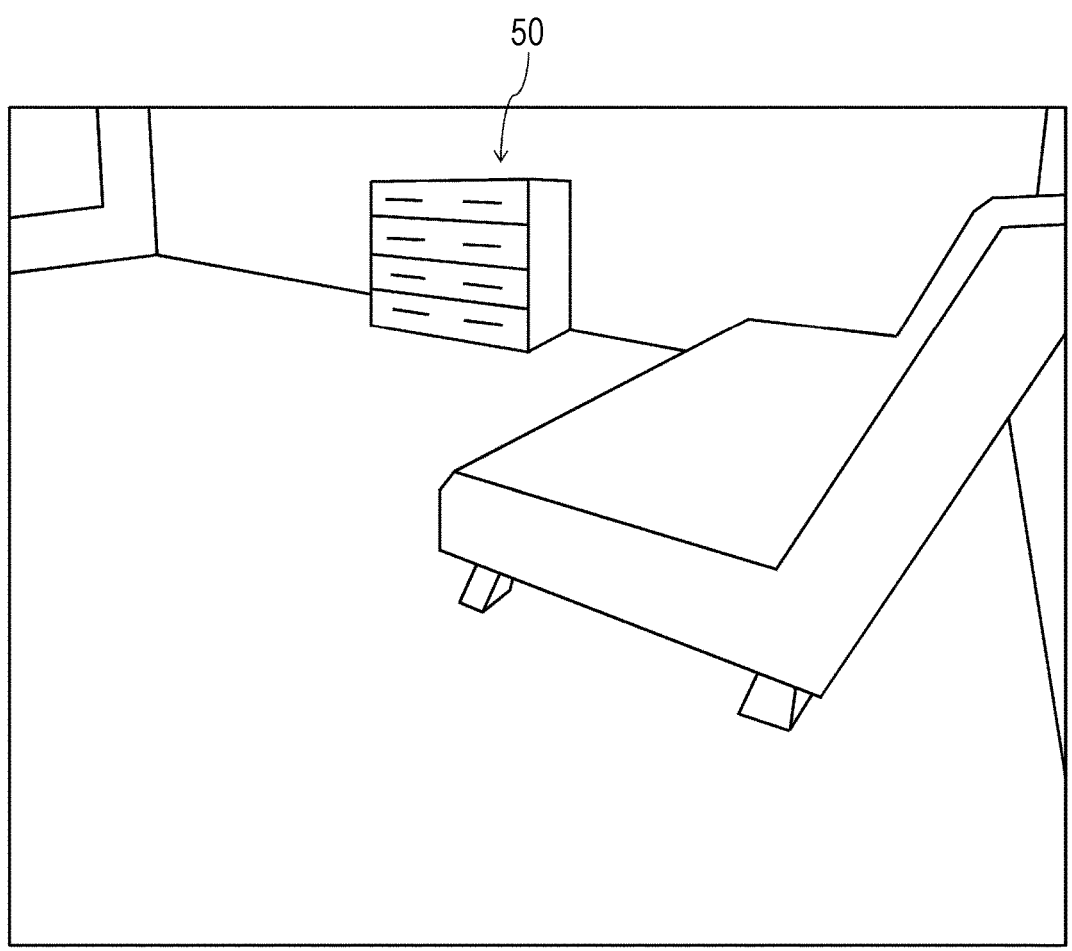
FIG. 3 is a diagram illustrating an example of a two-dimensional image.

The image processing unit 26 causes the generated two-dimensional image to be displayed on the display 14. FIG. 3 illustrates an example of a two-dimensional image displayed on the display 14. The two-dimensional image includes a virtual object image 50 corresponding to a virtual object arranged in a virtual three-dimensional space. The two-dimensional image illustrated in FIG. 3 is a two-dimensional image generated by projecting a virtual object representing a furniture item arranged in the virtual three-dimensional space representing a virtual room. However, a virtual object arranged in the virtual three-dimensional space is not limited to this example. For example, a network graph may be arranged in the virtual three-dimensional space, as described above.

In accordance with a change of the position or attitude of the information processing device 10 by the user, the position of the virtual viewpoint 40 or the sight direction 42 set by the sight direction setting unit 24 changes. The image processing unit 26 sequentially updates a two-dimensional image at a specific frame rate, generates a two-dimensional image corresponding to the changing virtual viewpoint 40 or sight direction 42, and causes the generated two-dimensional image to be displayed on the display 14.

The ray control unit 28 sets the emission position of a ray, which is a virtual laser emitted from the pointer 12, in the virtual three-dimensional space on the basis of the position of the pointer 12 in the real three-dimensional space, and sets the emission direction of the ray in the virtual three-dimensional space (hereinafter, referred to as an emission angle) on the basis of the attitude of the pointer 12 in the real three-dimensional space. The pointer 12 also includes an acceleration sensor, which is similar to the acceleration sensor 16 of the information processing device 10, that detects the position and attitude of the pointer 12 in the real three-dimensional space. The pointer 12 transmits a detection signal from the acceleration sensor to the information processing device 10. The ray control unit 28 detects the position and attitude of the pointer 12 on the basis of the detection signal received from the acceleration sensor of the pointer 12, and sets the emission position and emission angle of a ray on the basis of the position and attitude of the pointer 12.

Specifically, when the ray control unit 28 performs calibration, the emission position of a ray is set at a predetermined position in the virtual three-dimensional space. Then, on the basis of a displacement from a calibration position detected by the acceleration sensor of the pointer 12 (displacement in the real three-dimensional space), the emission position of the ray in the virtual three-dimensional space is changed. Furthermore, when the ray control unit 28 performs calibration, a predetermined direction in the virtual three-dimensional space is set as the emission angle of the ray. Then, on the basis of the rotation angle from a calibration attitude detected by the acceleration sensor of the pointer 12 (rotation angle in the real three-dimensional space), the emission angle of the ray in the virtual three-dimensional space is changed.

Hereinafter, the emission angle of a ray will be represented by a vector (θxp, θyp, θzp). θxp represents a rotation angle around the $X_V$ axis in the virtual three-dimensional space, θyp represents a rotation angle around the $Y_V$ axis in the virtual three-dimensional space, and θzp represents a rotation angle around the $Z_V$ axis in the virtual three-dimensional space. The vector (θxp, θyp, θzp) also represents the attitude of the pointer 12 in the real three-dimensional space.

Figure 4:
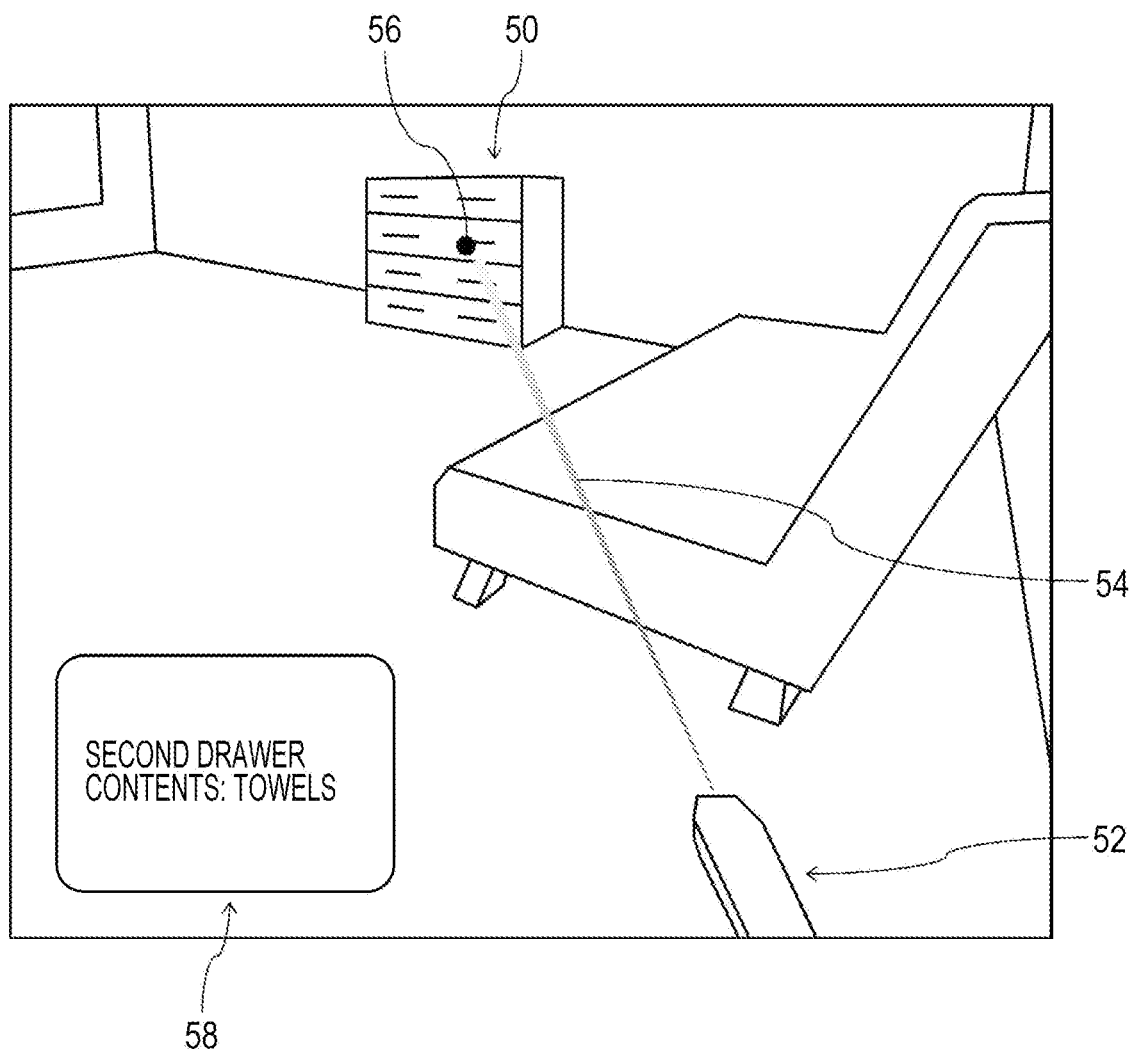
FIG. 4 is a diagram illustrating a two-dimensional image representing a state in which a virtual object is pointed using a pointer.

FIG. 4 is a diagram illustrating a two-dimensional image representing a state in which a virtual object is pointed using the pointer 12. When the user causes a ray to be emitted within the view (in other words, the view centered in the sight direction 42 when viewed from the virtual viewpoint 40), the image processing unit 26 generates a two-dimensional image including a pointer image 52 representing the pointer 12, a ray image 54 representing the ray emitted from the pointer 12, and an irradiation point image 56 representing an irradiation point at which the virtual object is irradiated with the ray, and causes the two-dimensional image to be displayed on the display 14.

The ray image 54 is obtained by producing a perspective projection of a ray extending at the emission angle (that is, the direction represented by the vector (θxp, θyp, θzp)) from the emission position set as described above onto the virtual screen 44 in the virtual three-dimensional space. Furthermore, the position of the irradiation point image 56 in the two-dimensional image is obtained by producing a perspective projection of an intersecting point between the virtual object and the ray in the virtual three-dimensional space.

When the user points a virtual object within the view by a ray, the processor 22 generates attribute information of the virtual object or an information display object indicating an enlarged view of the virtual object image 50 corresponding to the virtual object pointed by the ray or the like in the virtual three-dimensional space. By producing a perspective projection of the information display object, the image processing unit 26 causes a two-dimensional image including an information display frame 58 to be displayed on the display 14. With the display of the information display frame 58, the user is able to understand the attribute information of the virtual object pointed by the ray (for example, the name, contents, and the like of the virtual object) and the details of the virtual object image 50. When the virtual object is not pointed by the ray any more (the irradiation point of the ray has moved out of the virtual object), the processor 22 deletes the information display object, and the image processing unit 26 deletes the information display frame 58.

In this exemplary embodiment, a ray is constantly emitted from the pointer 12. However, switching between emission and stop of a ray from the pointer 12 may be performed in accordance with an instruction from a user (for example, pressing on a button provided on the pointer 12).

When the user changes the attitude of the pointer 12, the ray control unit 28 changes the emission direction of the ray in accordance with the change of the attitude of the pointer 12. By changing the emission direction of the ray, the user is able to point a desired virtual object. In accordance with the change of the emission direction of the ray, the image processing unit 26 generates a two-dimensional image including an updated ray image 54 and an updated irradiation point image 56, and causes the generated two-dimensional image to be displayed on the display 14.

The ray control unit 28 performs control for changing the sensitivity of the pointer 12 (may be called the sensitivity of the emission angle of a ray). The sensitivity of the pointer 12 represents the amount of angular change of the emission angle of a ray relative to the amount of angular change of the attitude of the pointer 12. Specifically, in the case where sensitivity reduction conditions that the amount of angular change of the sight direction 42 within a predetermined time is less than or equal to a threshold viewing angle and that the amount of angular change of the emission angle of a ray within a predetermined time is less than or equal to a threshold emission angle are satisfied, the ray control unit 28 reduces the sensitivity of the pointer 12, compared to the case where the sensitivity reduction conditions are not satisfied. Hereinafter, an operation mode of the information processing device 10 in the case where the sensitivity reduction conditions are not satisfied will be referred to as a normal sensitivity mode, and an operation mode of the information processing device 10 in the case where the sensitivity reduction conditions are satisfied will be referred to as a low sensitivity mode.

As described above, the sight direction 42 is represented by a vector ($\theta xu$, $\theta yu$, $\theta zu$). Thus, the amount of angular change of the sight direction 42 represents the amount of angular change of the vector ($\theta xu$, $\theta yu$, $\theta zu$). The amount of angular change of the vector ($\theta xu$, $\theta yu$, $\theta zu$) is represented by, for example, $\Delta\theta xu + \Delta\theta yu + \Delta\theta zu$. $\Delta\theta xu$ represents the difference between $\theta xu$ at a point in time and $\theta xu$ after a predetermined time has passed since the point in time. The same applies to $\Delta\theta yu$ and $\Delta\theta zu$. In this exemplary embodiment, the sight direction 42 is set based on the attitude of the information processing device 10. Thus, the amount of angular change of the sight direction 42 also represents the amount of angular change of the attitude of the information processing device 10.

In a similar manner, the emission angle of a ray is represented by a vector ($\theta xp$, $\theta yp$, $\theta zp$). Thus, the amount of angular change of the emission angle of the ray represents the amount of angular change of the vector ($\theta xp$, $\theta yp$, $\theta zp$). The amount of angular change of the vector ($\theta xp$, $\theta yp$, $\theta zp$) is represented by, for example, $\Delta\theta xp + \Delta\theta yp + \Delta\theta zp$. $\Delta\theta xp$ represents the difference between $\theta xp$ at a point in time and $\theta xp$ after a predetermined time has passed since the point in time. The same applies to $\Delta\theta yp$ and $\Delta\theta zp$. In this exemplary embodiment, the emission angle of a ray is set based on the attitude of the pointer 12. Thus, the amount of angular change of the emission angle of a ray also represents the amount of angular change of the attitude of the pointer 12.

The amount of angular change of the emission angle of a ray within a predetermined time may also be calculated based on the distance from the emission position of the ray to the irradiation point of the ray and the moving distance of the irradiation point of the ray within the predetermined time.

The emission position of a ray is set by the ray control unit 28 on the basis of the position of the pointer 12. Thus, the ray control unit 28 knows the emission position of the ray in the virtual three-dimensional space. The irradiation point of a ray is the first surface position of the virtual object in the direction of the emission angle of the ray (direction represented by the vector ($\theta xp$, $\theta yp$, $\theta zp$)) from the emission position of the ray. The ray control unit 28 also knows the position (coordinates) where each virtual object is arranged in the virtual three-dimensional space. Thus, the ray control unit 28 is able to calculate the position of the irradiation point of the ray on the basis of the emission position of the ray, the emission angle of the ray, and the position of the virtual object. Then, the ray control unit 28 calculates the distance from the emission position of the ray to the irradiation point of the ray.

When the irradiation point of a ray in the virtual three-dimensional space is represented by (Xp, Yp, Zp) (Xp represents the coordinates on the $X_V$ axis in the virtual three-dimensional space, Yp represents the coordinates on the $Y_V$ axis in the virtual three-dimensional space, and Zp represents the coordinates on the $Z_V$ axis in the virtual three-dimensional space), $\Delta\theta xp$, $\Delta\theta yp$, and $\Delta\theta zp$ are calculated using the following equations:

$$\Delta\theta xp = \tan^{-1}(\Delta Xp/L)$$

$$\Delta\theta yp = \tan^{-1}(\Delta Yp/L)$$

$$\Delta\theta zp = \tan^{-1}(\Delta Zp/L)$$

where $\Delta Xp$ represents the amount of change of Xp within a predetermined time, $\Delta Yp$ represents the amount of change of Yp within the predetermined time, $\Delta Zp$ represents the amount of change of Zp within the predetermined time, and L represents the distance from the emission position of the ray to the irradiation point of the ray.

Furthermore, a "predetermined time" may be set appropriately by an administrator of the information processing device 10 or the like. For example, a predetermined time may be set based on the frame rate of a two-dimensional image displayed on the display 14 (the number of two-dimensional images displayed on the display 14 per unit time). For example, in the case where the frame rate of a two-dimensional image is 60 frames per second (fps), a predetermined time is set to 1/60 seconds. However, in the case where the predetermined time is short, taking into consideration the influence of body movement of a user who is wearing or holding the information processing device 10, the average of a plurality of amounts of angular change of the sight direction 42 within a plurality of predetermined times may be treated as the amount of angular change that is used to be compared with the threshold viewing angle. Furthermore, in the case where the predetermined time is short, taking into consideration the influence of body movement of the user who is holding the pointer 12, the average of a plurality of amounts of angular change of the emission angle of a ray within a plurality of predetermined times may be treated as the amount of angular change that is used to be compared with the threshold emission angle.

In the case where the amount of angular change of the sight direction 42 within the predetermined time is less than or equal to the threshold viewing angle, the user is highly likely to be looking at a certain position (for example, a certain virtual object) in the virtual three-dimensional space. In contrast, the threshold viewing angle is set in advance by an administrator of the information processing device 10 or the like on the basis of the amount of angular change of the sight direction 42 in the case where the user is looking at a certain position in the virtual three-dimensional space and stored in the memory 20. For example, the threshold viewing angle is set to approximately 10 degrees.

Furthermore, in the case where the amount of angular change of the emission angle of the ray within the predetermined time is less than or equal to the threshold emission angle, the user is highly likely to be pointing or trying to point a certain position (for example, a certain virtual object) in the virtual three-dimensional space using the pointer 12. In contrast, the threshold emission angle is set in advance by the administrator of the information processing device 10 or the like on the basis of the amount of angular change of the emission angle of the ray in the case where the user is pointing or trying to point a certain position in the virtual three-dimensional space and stored in the memory 20. For example, the threshold emission angle is set to approximately 5 degrees. The threshold emission angle may be smaller than the threshold viewing angle.

In the case where the amount of angular change of the sight direction 42 within the predetermined time is less than or equal to the threshold viewing angle and the amount of angular change of the emission angle of the ray within the predetermined time is less than or equal to the threshold emission angle, the user is considered to need to perform fine control of the position of the irradiation point of the ray. If the sensitivity of the pointer 12 is high, it is difficult for the user to adjust the irradiation point of the ray to a desired position because the irradiation point of the ray greatly moves only by slightly moving the pointer 12. Thus, in this exemplary embodiment, in the case where the amount of angular change of the sight direction 42 within the predetermined time is less than or equal to the threshold viewing angle and the amount of angular change of the emission angle of the ray within the predetermined time is less than or equal to the threshold emission angle, in other words, in the case where the user is highly likely to be looking at a specific position in the virtual three-dimensional space and pointing or trying to point a specific position in the virtual three-dimensional space using the pointer 12, the ray control unit 28 reduces the sensitivity of the pointer 12.

As described above, the sensitivity of the pointer 12 represents the amount of angular change of the emission angle of a ray relative to the amount of angular change of the attitude of the pointer 12. Thus, reducing the sensitivity of the pointer 12 means reducing the amount of angular change of the emission angle of a ray relative to the amount of angular change of the attitude of the pointer 12. For example, in the normal sensitivity mode, when the attitude of the pointer 12 changes by 4 degrees in the X-axis direction in the real three-dimensional space, the ray control unit 28 changes the emission angle of a ray by 4 degrees in the $X_V$-axis direction in the virtual three-dimensional space. Meanwhile, in the low sensitivity mode, when the attitude of the pointer 12 changes by 4 degrees in the X-axis direction in the real three-dimensional space, the ray control unit 28 changes the emission angle of a ray by 2 degrees in the $X_V$-axis direction in the virtual three-dimensional space.

By reducing the sensitivity of the pointer 12, the user is able to easily point a desired position using the pointer 12. Furthermore, in this exemplary embodiment, the user does not need to perform a separate operation for changing the sensitivity of the pointer 12. In other words, the sensitivity of the pointer 12 is able to be reduced automatically. Thus, the user does not need to perform a switching operation for changing the sensitivity of the pointer 12.

Furthermore, typically, as the irradiation point of a ray approaches a position desired by a user or an area in the virtual three-dimensional space that the user tries to point decreases (narrows), the amount of angular change of the emission angle of the ray within the predetermined time decreases. Thus, the ray control unit 28 may reduce the sensitivity of the pointer 12 by a larger amount as the amount of angular change of the emission angle of the ray within the predetermined time decreases. Therefore, the user is able to point a desired position more easily using the pointer 12.

In principle, the ray control unit 28 changes the emission angle of a ray following a change of the attitude of the pointer 12. However, in the low sensitivity mode, the average of attitudes of the pointer 12 within a unit time (average of angles around individual axes of the pointer 12 within a unit time) may be defined as the emission angle of the ray. Thus, the influence of body movement of the user who is holding the pointer 12 is reduced, and the user becomes able to point a desired position more accurately using the pointer 12.

As long as the sensitivity reduction conditions described above are satisfied, the ray control unit 28 causes the information processing device 10 to remain in the low sensitivity mode. When the sensitivity reduction conditions described above become unsatisfied, the ray control unit 28 causes the information processing device 10 to return to the normal sensitivity mode.

In the virtual three-dimensional space, as the distance from the emission position of a ray to the irradiation point of the ray increases, the amount of movement of the irradiation point of the ray increases compared to the amount of angular change of the emission angle of the ray (that is, the amount of angular change of the attitude of the pointer 12). That is, in the virtual three-dimensional space, in the case where the distance from the emission position of a ray to a virtual object to which the user wants to point by the ray is long, it is difficult for the user to point a desired position by the ray.

Thus, the ray control unit 28 may first detect the distance from the emission position of a ray to the irradiation point of the ray in the virtual three-dimensional space. In the case where the sensitivity reduction conditions that the amount of angular change of the sight direction 42 within the predetermined time is less than or equal to the threshold viewing angle, that the amount of angular change of the emission angle of the ray within the predetermined time is less than or equal to the threshold emission angle, and that the distance from the emission position of the ray to the irradiation point of the ray in the virtual three-dimensional space is equal to or more than the threshold distance are satisfied, the ray control unit 28 may make the sensitivity of the pointer 12 lower than the sensitivity of the pointer 12 in the case where the sensitivity reduction conditions are not satisfied.

As described above, as the distance from the emission position of the ray to the irradiation point of the ray increases, the amount of movement of the irradiation point of the ray increases compared to the amount of angular change of the emission angle of the ray. Thus, as the distance from the emission position of the ray to the irradiation point of the ray in the virtual three-dimensional space increases, the ray control unit 28 may reduce the sensitivity of the pointer 12 by a larger amount.

A case where the image processing unit 26 causes the information display frame 58 (see FIG. 4) to be displayed on the display 14 will be considered. In this case, the user first sets the sight direction 42 to a certain direction so that a desired virtual object is able to be pointed by a ray, and then points the desired virtual object by the ray. In this process, the ray control unit 28 reduces the sensitivity of the pointer 12 (that is, sets the information processing device 10 to the low sensitivity mode). Then, the image processing unit 26 causes the information display frame 58 corresponding to an information display object indicating information about the virtual object pointed by the ray to be displayed on the display 14. The user may set the sight direction 42 toward the information display object generated in the virtual three-dimensional space so that the user is able to visually recognize the information display object. In this case, part of the sensitivity reduction conditions, that is, a condition that the amount of angular change of the sight direction 42 within a predetermined time is less than or equal to the threshold viewing angle, might not be satisfied.

However, as described above, because the information display object and the information display frame 58 are deleted when the irradiation point of the ray moves out of the virtual object, the user needs to maintain the emission angle of the ray such that the irradiation point of the ray does not move out of the virtual object while the user is visually recognizing the information display object (information display frame 58). In this case, if the sensitivity of the pointer 12 returns to the normal sensitivity, it may be difficult for the user to cause the irradiation point of the ray to maintain not to move out of the virtual object.

Thus, after the sensitivity reduction conditions are once satisfied, even when the sight direction 42 of the user changes greater than the threshold viewing angle, if it is determined, based on the changed sight direction 42 of the user, that the user is looking at the information display object, the ray control unit 28 may maintain the low sensitivity mode. The determination as to whether or not the user is looking at the information display object may be performed based on the position of the virtual viewpoint 40, the sight direction 42, and the position of the information display object in the virtual three-dimensional space.

Accordingly, because the sensitivity of the pointer 12 maintains low sensitivity while the user is visually recognizing the information display object, the user is able to more easily cause the irradiation point of the ray to maintain not to move out of the virtual object.

Figure 5:
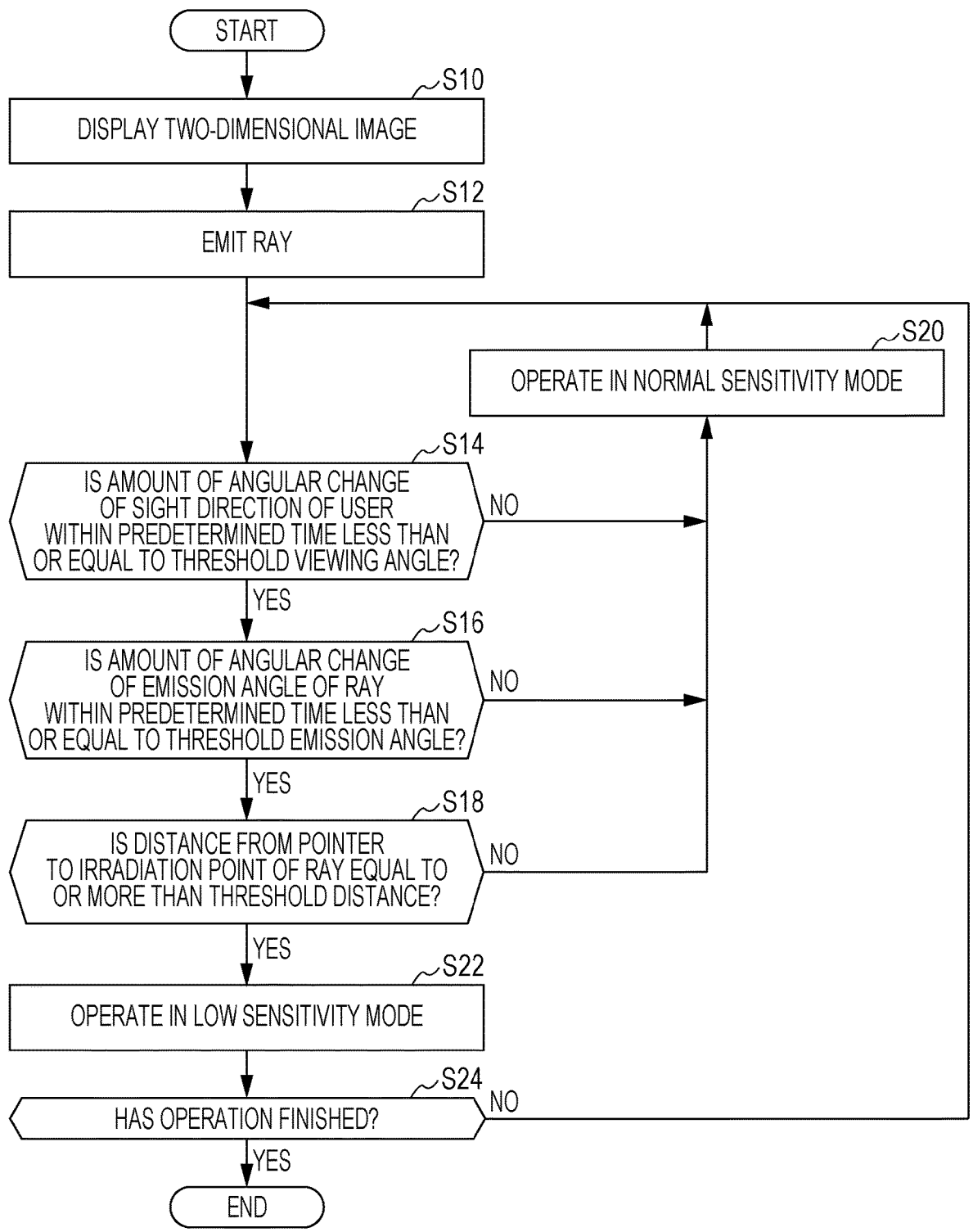
FIG. 5 is a flowchart illustrating a process performed by an information processing device according to an exemplary embodiment.

The configuration of the information processing device 10 according to this exemplary embodiment is as described above. A process performed by the information processing device 10 according to this exemplary embodiment will be described with reference to a flowchart illustrated in FIG. 5.

In step S10, the sight direction setting unit 24 sets the virtual viewpoint 40 in the virtual three-dimensional space on the basis of the position of the information processing device 10, and sets the sight direction 42 in the virtual three-dimensional space on the basis of the attitude of the information processing device 10. Then, the image processing unit 26 generates a two-dimensional image by projecting the virtual three-dimensional space based on the set virtual viewpoint 40 and the set sight direction 42, and causes the two-dimensional image to be displayed on the display 14. The image processing unit 26 sequentially updates the two-dimensional image at a predetermined frame rate, and causes two-dimensional images each corresponding to the changing virtual viewpoint 40 or sight direction 42 to be displayed on the display 14.

In step S12, the ray control unit 28 sets the emission position of a ray in the virtual three-dimensional space on the basis of the position of the pointer 12 in the real three-dimensional space, and sets the emission angle of the ray in the virtual three-dimensional space on the basis of the attitude of the pointer 12 in the real three-dimensional space. Then, the ray control unit 28 causes the ray to be emitted from the set emission position to the direction of the emission angle in the virtual three-dimensional space. At the start up of the information processing device 10, the operation mode of the information processing device 10 is the normal sensitivity mode.

In step S14, the ray control unit 28 determines whether or not the amount of angular change of the sight direction 42 within a predetermined time is less than or equal to a threshold viewing angle. In the case where the amount of angular change of the sight direction 42 within the predetermined time is less than or equal to the threshold viewing angle, the process proceeds to step S16.

In step S16, the ray control unit 28 determines whether or not the amount of angular change of the emission angle of the ray within a predetermined time is less than or equal to a threshold emission angle. In the case where the amount of angular change of the emission angle of the ray within the predetermined time is less than or equal to the threshold emission angle, the process proceeds to step S18.

In step S18, the ray control unit 28 detects the distance from the emission position of the ray to the irradiation point of the ray in the virtual three-dimensional space and determines whether or not the distance from the emission position of the ray to the irradiation point of the ray is equal to or more than a threshold distance. In the case where the distance from the emission position of the ray to the irradiation point of the ray is equal to or more than the threshold distance, the process proceeds to step S22.

In the case where it is determined in step S14 that the amount of angular change of the sight direction 42 within the predetermined time is more than the threshold viewing angle, in the case where it is determined in step S16 that the amount of angular change of the emission angle of the ray within the predetermined time is more than the threshold emission angle, or in the case where it is determined in step S18 that the distance from the emission position of the ray to the irradiation point of the ray is less than the threshold distance, the process proceeds to step S20. In step S20, the ray control unit 28 changes the operation mode of the information processing device 10 to the normal sensitivity mode or maintains the normal sensitivity mode. That is, the sensitivity of the pointer 12 is changed to normal sensitivity or maintains normal sensitivity.

In step S22, the ray control unit 28 changes the operation mode of the information processing device 10 to the low sensitivity mode or maintains the low sensitivity mode. That is, the sensitivity of the pointer 12 is changed to low sensitivity or maintains low sensitivity.

In step S24, the ray control unit 28 determines whether or not the operation of the information processing device 10 has finished. For example, when the power of the information processing device 10 is turned off, the result of the determination in step S24 is "YES", and the information processing device 10 ends the process. In the case where it is determined that the operation of the information processing device 10 has not finished, the process returns to step S14.

As described above, while the information processing device 10 is operating, the ray control unit 28 repeats the processing steps S14 to S24. The ray control unit 28 repeats processing for setting the pointer 12 to low sensitivity in the case where sensitivity reduction conditions described in steps S14 to S18 are satisfied and setting the pointer 12 to normal sensitivity in the case where the sensitivity reduction conditions are not satisfied.

The exemplary embodiment according to the present disclosure has been described above. However, the present disclosure is not limited to the exemplary embodiment described above. Various modifications may be made without departing from the spirit of the present disclosure.

For example, each of the functions of the processor 22 of the information processing device 10 may be implemented by an apparatus (for example, a server) different from equipment used by being worn or held by a user. In this case, the apparatus such as a server receives information indicating the position, attitude, and the like of the equipment used by being worn or held by the user from the acceleration sensor 16 of the equipment, and sets the virtual viewpoint 40 and the sight direction 42. Furthermore, by causing a two-dimensional image generated by the image processing unit 26 of the apparatus such as the server to be transmitted to the equipment used by being worn or held by the user, the two-dimensional image is displayed on the display of the equipment. Furthermore, the ray control unit 28 of the apparatus such as the server calculates the amount of angular change of the sight direction 42 of the user on the basis of information indicating the attitude of the equipment used by being worn or held by the user acquired from the acceleration sensor 16 of the equipment, calculates the amount of angular change of the emission angle of a ray on the basis of information indicating the attitude of the pointer 12 acquired from the pointer 12, and sets the sensitivity of the pointer 12 on the basis of the amount of angular change of the sight direction 42 of the user and the amount of angular change of the emission angle of the ray.

Furthermore, although the information processing device 10 is a VR device in the exemplary embodiment described above, the information processing device 10 may be an AR device, an MR device, or an SR device. In this case, the image processing unit 26 generates a two-dimensional image by projecting a virtual three-dimensional space to be superimposed on a photographed image of a real space photographed with a camera (not illustrated in figures) provided in the information processing device 10, and causes the two-dimensional image to be displayed on the display 14. The display 14 may be a transmissive-type display. In the case where the display 14 is a transmissive-type display, the two-dimensional image generated by the image processing unit 26 is displayed on the display 14, so that an image that is a superposition of the real world transmitting through the display 14 and the two-dimensional image generated by the image processing unit 26 is presented to the user. In the case where the information processing device 10 is an AR device, an MR device, or an SR device, the user is also able to point a virtual object by a ray emitted to a virtual three-dimensional space. In this case, the ray control unit 28 is also able to change the sensitivity of the pointer 12 by performing the process described above.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    a processor configured to:
        based on an attitude of equipment being worn or held by a user, set a sight direction of the user in a virtual three-dimensional space;
        based on a virtual viewpoint and the sight direction set in the virtual three-dimensional space, generate a two-dimensional image by projecting the virtual three-dimensional space;
        cause the two-dimensional image to be displayed on a display;
        based on an attitude of a pointer being held by the user, set an emission angle of a ray emitted virtually to the virtual three-dimensional space; and
        in a case where sensitivity reduction conditions that an amount of angular change of the sight direction of the user within a predetermined time is less than or equal to a threshold viewing angle and that an amount of angular change of an emission angle of the ray within a predetermined time is less than or equal to a threshold emission angle are satisfied, reduce the amount of angular change of the emission angle of the ray relative to the amount of angular change of the attitude of the pointer, compared to a case where the sensitivity reduction conditions are not satisfied.

2. The information processing device according to claim 1,
    wherein the processor is configured to detect a distance from an emission position of the ray to an irradiation point of the ray in the virtual three-dimensional space, and
    wherein the sensitivity reduction conditions further include a condition that the distance from the emission position of the ray to the irradiation point of the ray in the virtual three-dimensional space is equal to or more than a threshold distance.

3. The information processing device according to claim 2, wherein the processor is configured to, as the distance from the emission position of the ray to the irradiation point of the ray in the virtual three-dimensional space increases, reduce the amount of angular change of the emission angle of the ray relative to the amount of angular change of the attitude of the pointer by a larger amount.

4. The information processing device according to claim 3,
    wherein the processor is configured to:
        generate an information display object indicating information about a virtual object pointed by the ray in the virtual three-dimensional space;
        cause a two-dimensional image including an image obtained by projecting the information display object to be displayed on the display; and
        even if the sight direction of the user changes more than the threshold viewing angle after the sensitivity reduction conditions are satisfied, in a case where it is determined, based on the changed sight direction of the user, that the user is looking at the information display object, maintain a state in which the amount of angular change of the emission angle of the ray relative to the amount of angular change of the attitude of the pointer is reduced.

5. The information processing device according to claim 2,
wherein the processor is configured to:
generate an information display object indicating information about a virtual object pointed by the ray in the virtual three-dimensional space;
cause a two-dimensional image including an image obtained by projecting the information display object to be displayed on the display; and
even if the sight direction of the user changes more than the threshold viewing angle after the sensitivity reduction conditions are satisfied, in a case where it is determined, based on the changed sight direction of the user, that the user is looking at the information display object, maintain a state in which the amount of angular change of the emission angle of the ray relative to the amount of angular change of the attitude of the pointer is reduced.

6. The information processing device according to claim 1, wherein the processor is configured to, as the amount of angular change of the emission angle of the ray within the predetermined time decreases, reduce the amount of angular change of the emission angle of the ray relative to the amount of angular change of the attitude of the pointer by a larger amount.

7. The information processing device according to claim 6,
wherein the processor is configured to:
generate an information display object indicating information about a virtual object pointed by the ray in the virtual three-dimensional space;
cause a two-dimensional image including an image obtained by projecting the information display object to be displayed on the display; and
even if the sight direction of the user changes more than the threshold viewing angle after the sensitivity reduction conditions are satisfied, in a case where it is determined, based on the changed sight direction of the user, that the user is looking at the information display object, maintain a state in which the amount of angular change of the emission angle of the ray relative to the amount of angular change of the attitude of the pointer is reduced.

8. The information processing device according to claim 1,
wherein the processor is configured to:
generate an information display object indicating information about a virtual object pointed by the ray in the virtual three-dimensional space;
cause a two-dimensional image including an image obtained by projecting the information display object to be displayed on the display; and
even if the sight direction of the user changes more than the threshold viewing angle after the sensitivity reduction conditions are satisfied, in a case where it is determined, based on the changed sight direction of the user, that the user is looking at the information display object, maintain a state in which the amount of angular change of the emission angle of the ray relative to the amount of angular change of the attitude of the pointer is reduced.

9. An information processing method comprising:
based on an attitude of equipment being worn or held by a user, setting a sight direction of the user in a virtual three-dimensional space;
based on a virtual viewpoint and the sight direction set in the virtual three-dimensional space, generating a two-dimensional image by projecting the virtual three-dimensional space;
causing the two-dimensional image to be displayed on a display;
based on an attitude of a pointer being held by the user, setting an emission angle of a ray emitted virtually to the virtual three-dimensional space; and
in a case where sensitivity reduction conditions that an amount of angular change of the sight direction of the user within a predetermined time is less than or equal to a threshold viewing angle and that an amount of angular change of an emission angle of the ray within a predetermined time is less than or equal to a threshold emission angle are satisfied, reducing the amount of angular change of the emission angle of the ray relative to the amount of angular change of the attitude of the pointer, compared to a case where the sensitivity reduction conditions are not satisfied.

10. A non-transitory computer readable medium storing a program causing a computer to execute a process for information processing, the process comprising:
based on an attitude of equipment being worn or held by a user, setting a sight direction of the user in a virtual three-dimensional space;
based on a virtual viewpoint and the sight direction set in the virtual three-dimensional space, generating a two-dimensional image by projecting the virtual three-dimensional space;
causing the two-dimensional image to be displayed on a display;
based on an attitude of a pointer being held by the user, setting an emission angle of a ray emitted virtually to the virtual three-dimensional space; and
in a case where sensitivity reduction conditions that an amount of angular change of the sight direction of the user within a predetermined time is less than or equal to a threshold viewing angle and that an amount of angular change of an emission angle of the ray within a predetermined time is less than or equal to a threshold emission angle are satisfied, reducing the amount of angular change of the emission angle of the ray relative to the amount of angular change of the attitude of the pointer, compared to a case where the sensitivity reduction conditions are not satisfied.

* * * * *